(12) United States Patent
Said

(10) Patent No.: US 6,907,672 B2
(45) Date of Patent: Jun. 21, 2005

(54) SYSTEM AND METHOD FOR MEASURING THREE-DIMENSIONAL OBJECTS USING DISPLACEMENTS OF ELONGATE MEASURING MEMBERS

(75) Inventor: Amir Said, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/684,284

(22) Filed: Oct. 11, 2003

(65) Prior Publication Data

US 2005/0076521 A1 Apr. 14, 2005

(51) Int. Cl.[7] .............................................. G01B 5/20
(52) U.S. Cl. ........................... 33/552; 33/772; 702/167
(58) Field of Search ........................ 33/701, 706, 707, 33/709, 340, 514.2, 515, 552, 561.1, 554, 772, 832, 833, 551, 553; 702/152, 153, 167, 168

(56) References Cited

U.S. PATENT DOCUMENTS

| | | | | |
|---|---|---|---|---|
| 3,121,956 A | * | 2/1964 | Philbin | 33/772 |
| 4,400,884 A | * | 8/1983 | Baresh et al. | 33/561.1 |
| 4,444,204 A | * | 4/1984 | Bryant et al. | 33/514.2 |
| 5,640,779 A | * | 6/1997 | Rolloff et al. | 33/514.2 |
| 6,125,337 A | | 9/2000 | Rosenberg et al. | 702/153 |
| 6,125,338 A | * | 9/2000 | Brienza et al. | 702/167 |
| 6,160,264 A | * | 12/2000 | Rebiere | 33/552 |
| 6,298,587 B1 | * | 10/2001 | Vollom | 33/561.1 |
| 6,654,705 B1 | * | 11/2003 | Benson et al. | 702/152 |
| 6,700,563 B1 | * | 3/2004 | Koizumi | 702/168 |
| 2004/0073399 A1 | * | 4/2004 | Benson et al. | 702/168 |

* cited by examiner

*Primary Examiner*—G. Bradley Bennett

(57) ABSTRACT

A system and method for measuring a three-dimensional object uses a number of elongate measuring members that can be displaced with respect to a base in response to a surface of the object. The displaced distances of the elongate measuring members due to the surface of the object are then determined. The displaced distances are measurements of the object surface.

23 Claims, 9 Drawing Sheets

SYSTEM AND METHOD FOR MEASURING THREE-DIMENSIONAL OBJECTS USING DISPLACEMENTS OF ELONGATE MEASURING MEMBERS

FIELD OF THE INVENTION

The invention relates generally to measuring systems, and more particularly to a system and method for measuring three-dimensional objects.

BACKGROUND OF THE INVENTION

A virtual or computer-generated three-dimensional model allows a user to easily manipulate and/or modify the model and its surrounding environment. Thus, virtual three-dimensional models of physical objects are widely used by professionals, such as animators, architects, designers, engineers and scientists. Virtual three-dimensional models are usually created by measuring physical objects using a contact or non-contact technique to extract spatial information from the physical objects. The spatial information is then processed to render the measured physical objects into virtual three-dimensional models.

Some non-contact measuring techniques involve the use of laser light to measure relative positions of different surface points on a physical object. The relative distance measurements are based on the travel time of laser light. A concern with systems that use laser light for three-dimensional measurements is that timing of the laser light is limited by the switching frequency of the laser light and the delay measurements of the received laser light, which must be extremely precise especially when measuring small objects. Another concern with such systems is that, if the object is highly reflective, such as a metallic object, or is transparent or translucent, the measuring systems may fail or provide unreliable measurements.

Other non-contact measuring techniques involve the use of photos of an object based on parallax to triangulate the relative positions of different surface points on the object. Thus, a precise knowledge of camera position, relative to the object, for each photo is required to solve the triangulation equations with reasonable precision. A concern with systems that use photos for three-dimensional measurements is the resulting measurements are much less precise than the measurements based on laser light. Another concern is that such systems require the surface of an object to have special optical properties. For example, the surface of an object must be such that light must reflect in ways not too different from an ideal model of Lambertian reflections. In addition, the mathematical triangulation problem is ill-defined for large areas of an object with the same color. For instance, due to lack of contrast, it is practically impossible to measure small surface variations in a large white surface using triangulation based on photos.

Contact measuring techniques typically involve the use of a touch-based sensor or stylus to manually contact different surface points of an object to measure the relative positions of the surface points. A concern with systems that use a touch-based sensor is that the surface points are manually measured one point at a time. Consequently, the process of measuring the surface points using such a measuring system requires a significant amount of time.

In view of these concerns, there is a need for a system and method for measuring three-dimensional objects with precision and efficiency.

SUMMARY OF THE INVENTION

A system and method for measuring a three-dimensional object uses a number of elongate measuring members, such as pins, that can be displaced in a direction parallel to the central axes of the elongate measuring members in response to a surface of the object. The displaced distances of the measuring members are measurements of the object surface. These measurements can be used to create a virtual three-dimensional model of the measured object. The use of multiple measuring members allows the measurements to be made in parallel, which translates into a significantly shorter measuring process than conventional measuring techniques that acquire similar measurements one at a time.

A system for measuring a three-dimensional object in accordance with an embodiment of the invention includes a base, elongate measuring members and a displacement-determining mechanism. The elongate measuring members are operatively connected to the base such that the measuring members can be displaced with respect to the base in response to a surface of the three-dimensional object being measured. The displacement-determining mechanism is configured to determine the displaced distances of the elongate measuring members due to the object surface.

A method for measuring a three-dimensional object in accordance with an embodiment of the invention includes engaging a surface of the three-dimensional object with displaceable measuring members and displacing the displaceable measuring members in response to the object surface. The method further includes determining displaced distances of the measuring members.

Other aspects and advantages of the present invention will become apparent from the following detailed description, taken in conjunction with the accompanying drawings, illustrated by way of example of the principles of the invention.

DETAILED DESCRIPTION

Figure 1:
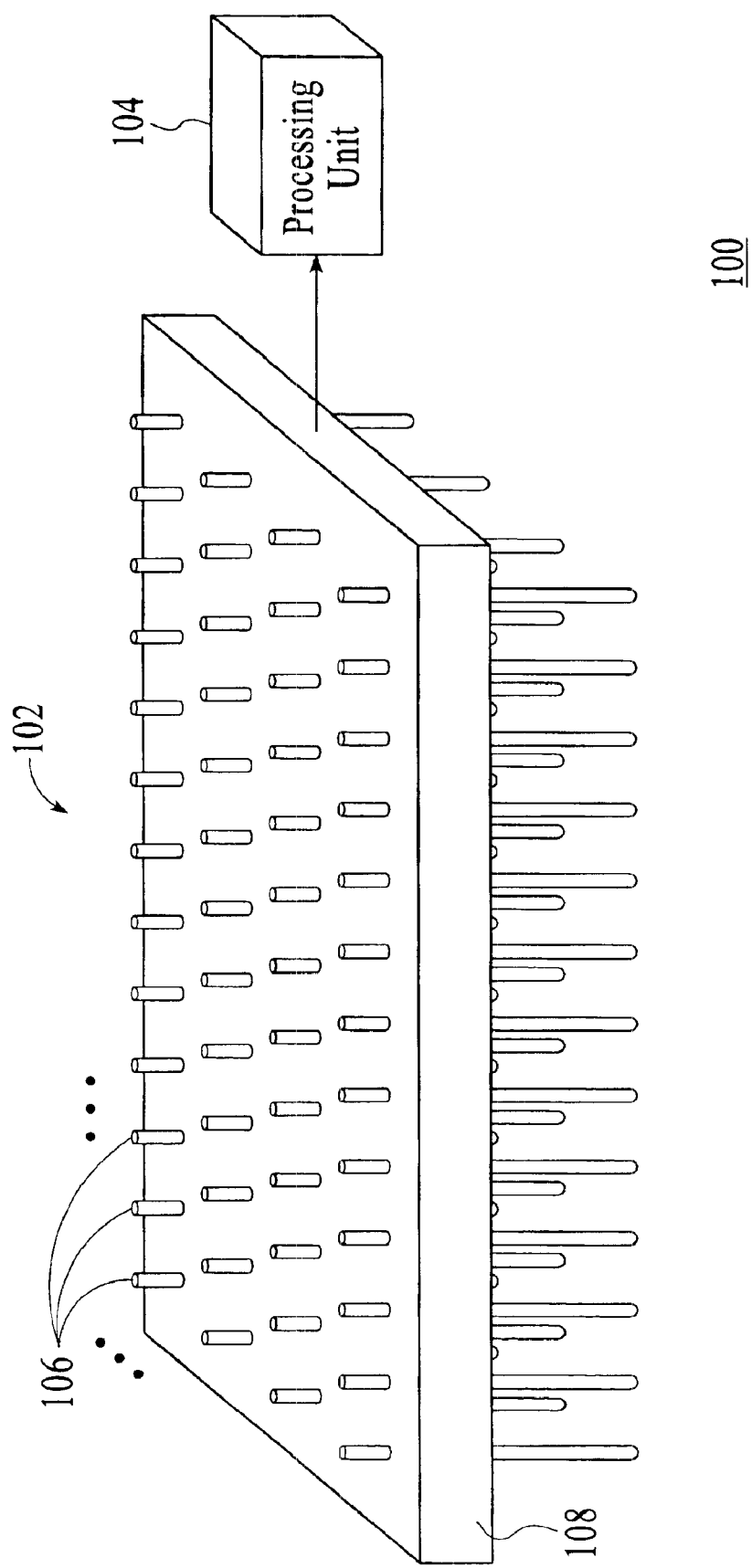
FIG. 1 is a diagram of a system for measuring three-dimensional objects in accordance with an embodiment of the present invention.

With reference to FIG. 1, a system 100 for measuring three-dimensional objects in accordance with an embodiment of the invention is shown. The system 100 operates to measure a surface of a three-dimensional object using a contact measuring technique. Consequently, the optical properties of the object surface do not impede or degrade the measurements made by the system 100. In contrast to conventional measuring systems, the contact measuring technique performed by the system 100 acquires multiple measuring points on the object surface to be measured in parallel. Thus, the system 100 can measure a three-dimensional object in a significantly shorter period than conventional systems, which typically employ contact measuring techniques that acquire similar measuring points one at a time.

As illustrated in FIG. 1, the system 100 includes a measuring device 102 and a processing unit 104. The measuring device 102 is designed to measure relative spatial positions of points on a surface of a three-dimensional object using a number of displaceable elongate measuring pins 106. The relative positions of the surface points are measured by determining how much distance each measuring pin 106 has been displaced by the object surface at a particular point when the measuring device 102 is placed on the object being measured. Since the object surface at different points will displace the measuring pins 106 according to the relative positions of the surface points, the displaced positions of the measuring pins 106 by the different surface points can be used to measure the relative positions of the surface points, which can then be used to produce a virtual or computer generated model of the measured object. Although the displaceable measuring pins 106 are identified herein as being pins, the displaceable measuring pins may be any elongate members, such as thin rods.

Figure 2:
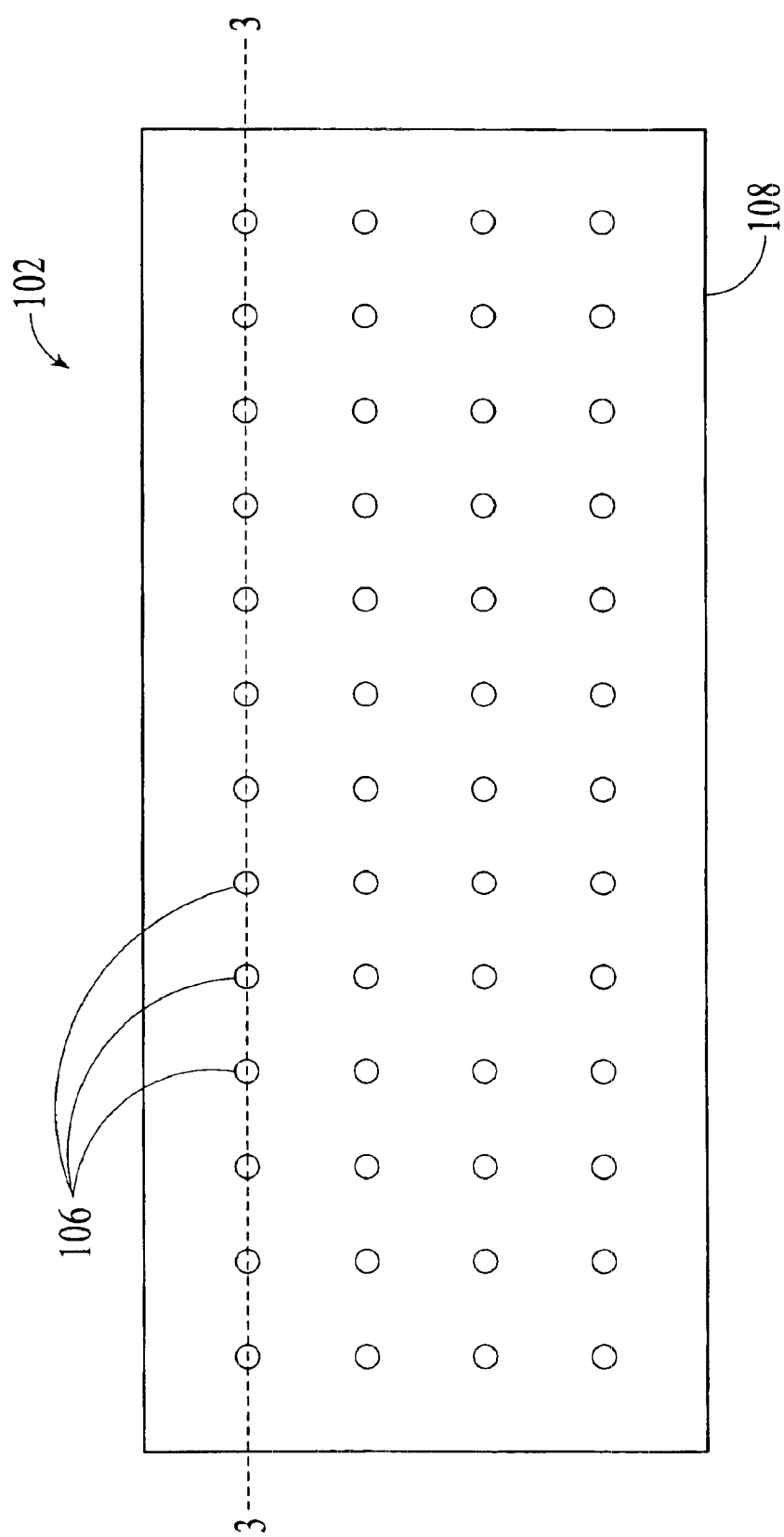
FIG. 2 is a top view of a measuring device of the system of FIG. 1.
Figure 3:
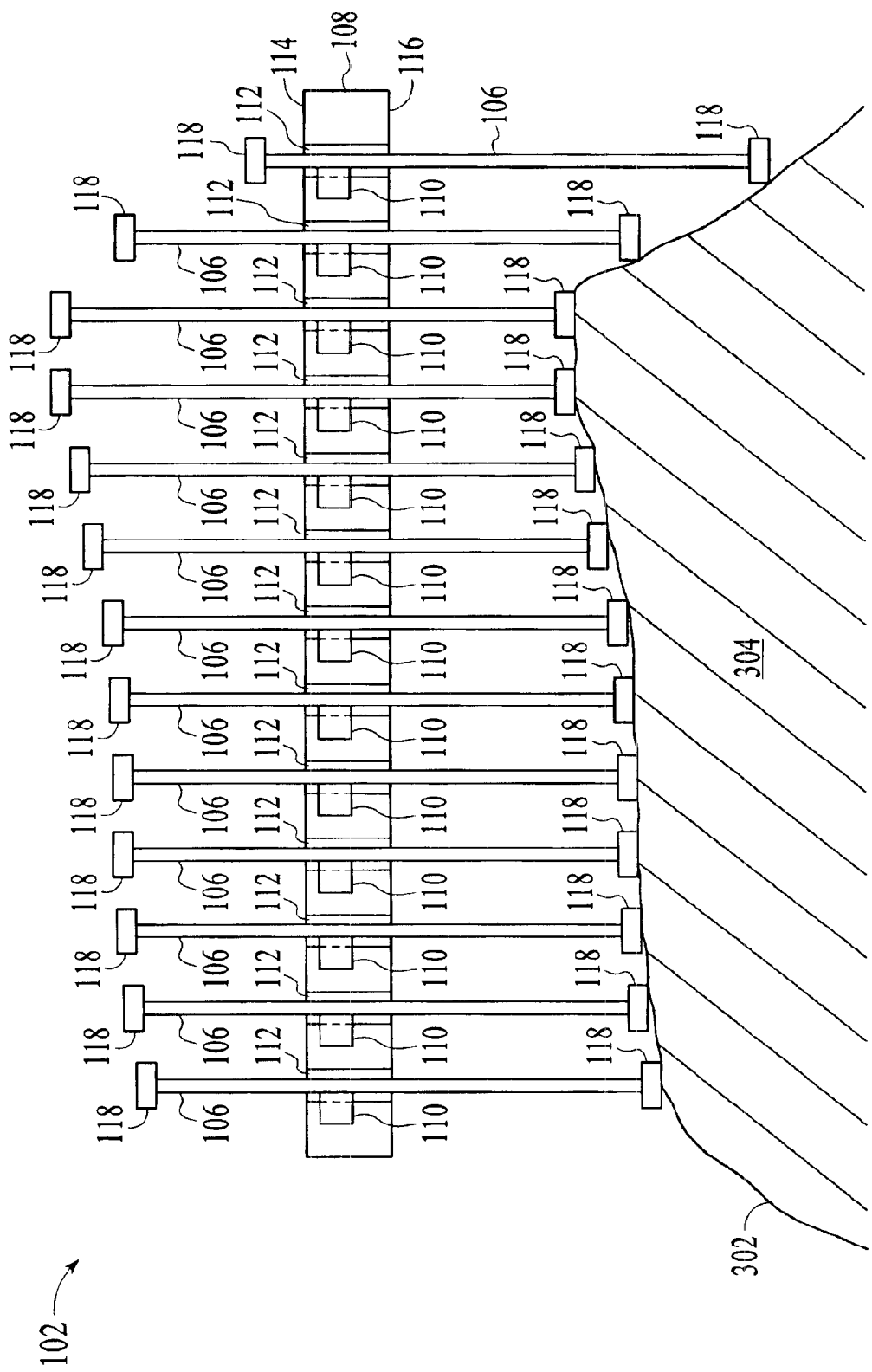
FIG. 3 is a cross-sectional view of the measuring device of the system of FIG. 1.

The measuring device 102 includes the displaceable measuring pins 106, a base 108 and position sensors 110, which are shown in FIGS. 1, 2 and 3. The position sensors 110 are only shown in FIG. 3. FIG. 2 is a top view of the measuring device 102, while FIG. 3 is a cross-sectional view of the measuring device 102 along the dotted line 3—3, as indicated in FIG. 2. The position sensors 110 are attached to the base 108, and the measuring pins 106 are held together by the base. Thus, the base 108 provides structural integrity to the measuring device 102. In the illustrated embodiment, the base 108 is shaped like a rectangular box. However, in other embodiments, the base 108 may be configured in other shapes. The base 108 includes a number of openings 112 extending through the top and bottom surfaces 114 and 116 of the base. As shown in FIG. 3, the bottom surface 116 is the surface of the base 108 that faces the surface 302 of a three-dimensional object 304 being measured. The top surface 114 of the base 108 is parallel to the bottom surface 116. The openings 112 are large enough for the measuring pins 106 to be displaced in a direction parallel to the central axes of the pins, which extend along the lengths of the pins. In some embodiments, the shapes of the openings 112 and the cross-sections of the measuring pins 106 may be configured so that the measuring pins cannot rotate about the central axes. As an example, both the cross-sections of the measuring pins 106 and the openings 112 of the base 108 may be octagonal in shape. In other embodiments, the cross-sections of the measuring pins 106 and the openings 112 of the base 108 may be configured so that the measuring pins can freely rotate about the central axes of the pins. The openings 112 and the cross-sections of the measuring pins 106 may be configured in any shapes.

The displaceable measuring pins 106 of the measuring device 102 are positioned in the openings 112 of the base 108. In the illustrated embodiment of FIG. 3, each measuring pin 106 has stoppers 118 at both ends of the pin so that the measuring pins cannot fall out of the respective opening 112 of the base 108. Thus, each measuring pin 106 can be displaced between a default position, i.e., the position of the measuring pin when the top stopper 118 of the pin is at the top surface 114 of the base 108, to a maximum position, i.e., the position of the measuring pin when the bottom stopper is at the bottom surface 116 of the base. As used herein, a displaced distance of a measuring pin 106 is defined as the relative distance traveled by the measuring pin from the default position to a displaced position. In other embodiments, the measuring pins 106 may have other mechanisms to prevent the pins from being separated from the base 108.

The position sensors 110 of the measuring device 102 are located within the base 108 such that each position sensor is situated in one of openings 112 of the base. The position sensors 110 are designed to determine the displaced distances of the measuring pins 106 when the measuring device 102 is placed on a surface of an object to be measured. Thus, the position sensors 110 are parts of a mechanism for determining the displaced distances of the measuring pins 106. Furthermore, the position sensors 110 are designed to generate signals according to the determined distances of the measuring pins 106. The generated signals can then be transmitted to the processing unit 104 to process the information contained in the signals to create a virtual three-dimensional model of the measured object. The processing unit 104 may be any signal processing device, such as a personal computer.

Figure 4:
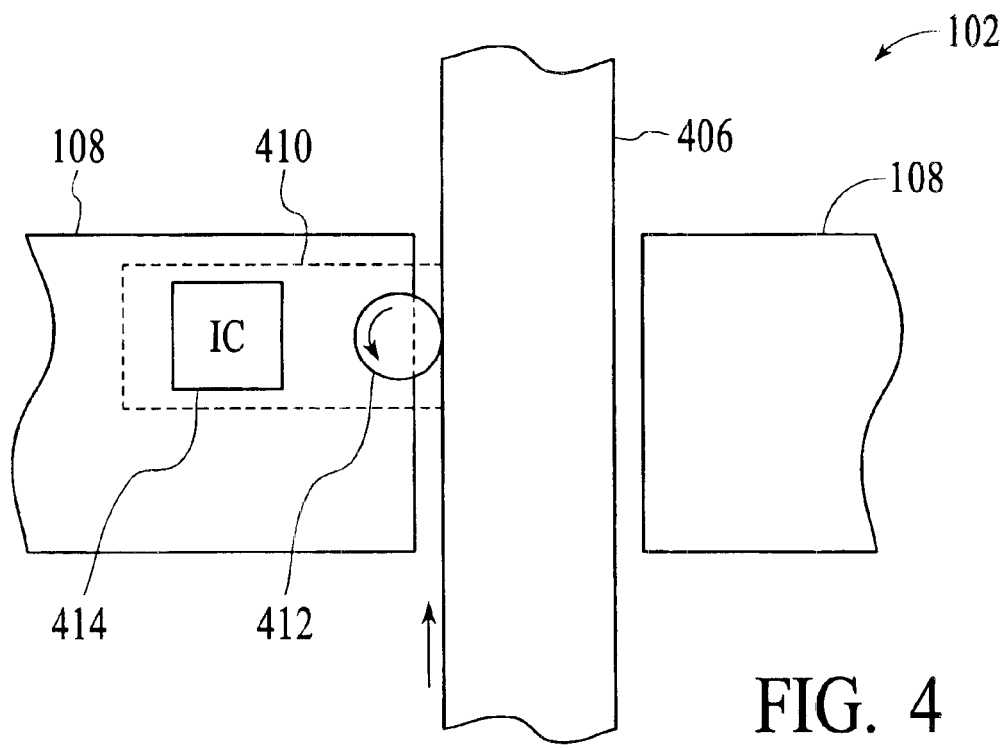
FIG. 4 is a partial cross-sectional view of the measuring device of the system of FIG. 1 in accordance with an embodiment of the invention.

In an embodiment, the position sensors 110 may be mechanical sensors to track the movements of the measuring pins 106 using, for example, rollers, as the measuring pins are displaced by an object surface to determine the displaced distances of the measuring pins. FIG. 4 illustrates a portion of the measuring device 102, which shows an exemplary mechanical position sensor 410 and an associated measuring pin 406 in accordance with this embodiment. The mechanical position sensor 410 includes a roller 412 and an integrated circuit 414. The roller 412 is in constant contact with the measuring pin 406. Thus, as the measuring pin 406 is displaced, the roller 412 rotates in response to the displacement. The roller 412 is connected to the integrated circuit 414, which monitors the rotation of the roller as the measuring pin 406 is displaced from the default position to a final displaced position to determine the displaced distance of the measuring pin.

Figure 5:
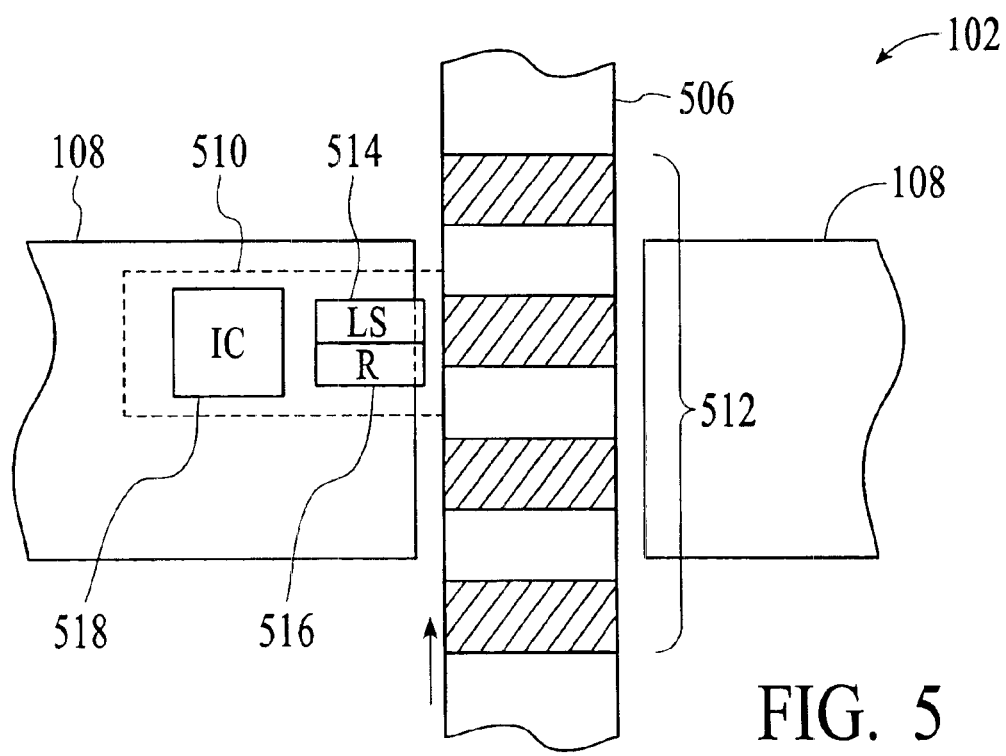
FIG. 5 is a partial cross-sectional view of the measuring device of the system of FIG. 1 in accordance with another embodiment of the invention.

In another embodiment, the position sensors 110 of the measuring device 102 may be optical sensors to optically track the movements of the measuring pins 106 using, for example, visual markings on the measuring pins to determine the displaced distances of the measuring pins. FIG. 5 illustrates a portion of the measuring device 102, which shows an exemplary optical position sensor 510 and an associated measuring pin 506 with visual markings 512 in accordance with this embodiment. As an example, the visual markings 512 of the measuring pin 506 may include alternating high and low reflective regions along the length of the pin that can be used for optical tracking. However, other visual markings may be used for optical tracking. The high reflective regions may be areas of the measuring pin 506 that are covered with metallic or white material, while the low reflective regions may be areas of the measuring pin that are covered with black material.

As shown in FIG. 5, the optical position sensor 510 includes a light source (LS) 514, an optical receiver (R) 516 and an integrated circuit 518. As an example, the light source 514 may be a light-emitting diode and the optical receiver 516 may be a photodiode. However, any light source and any optical receiver may instead be used. The light source 514 projects light toward the measuring pin 506. Depending on the is current position of the measuring pin 506, the projected light strikes either a high or low reflective region of the visual markings 512. In response, the optical receiver 516 generates a high signal if the projected light strikes a high reflective region and a low signal if the transmitted light strikes a low reflective region. Since the visual position markings 512 includes alternating high and low reflective regions, as the measuring pin 506 is displaced, the reading from the optical receiver 516 will alternate between high and low signals. The optical receiver 516 is connected to the integrated circuit 518, which receives the signals from the optical receiver. The integrated circuit 518 is able to determine the displaced distance of the measuring pin 506 by counting the number of times that the signal from the optical receiver 516 change, which indicates the number of borders between the high and low reflective regions of the visual position markings that passed the optical receiver. Since the number of borders between the high and low reflective regions corresponds to the displaced distance of the measuring pin 506, the integrated circuit 518 can determine the displaced distance of the measuring pin.

Figure 6:
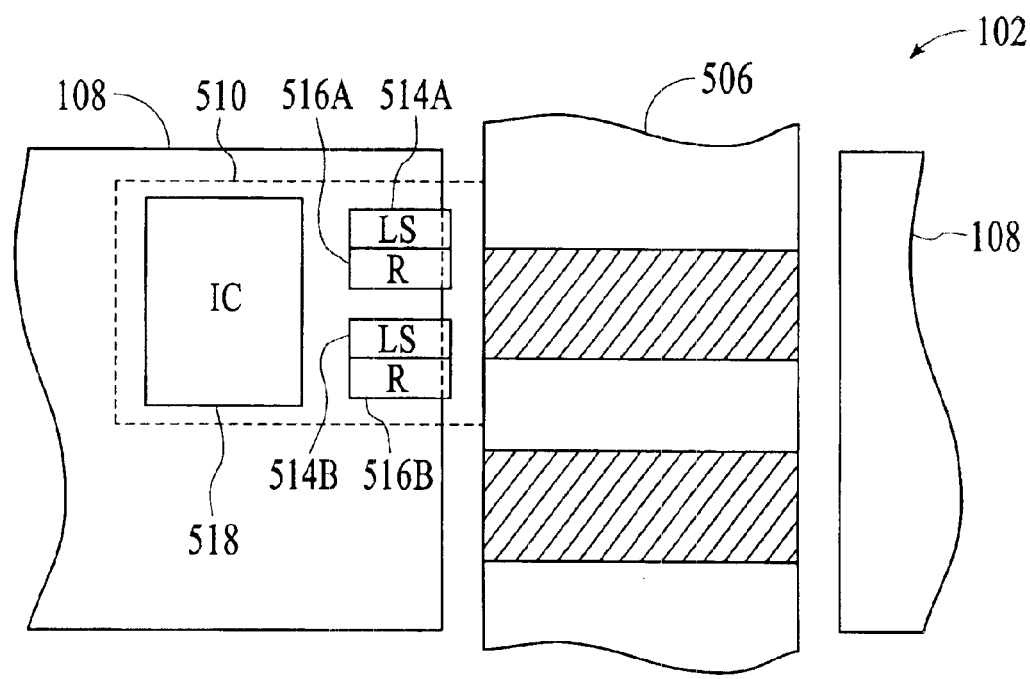
FIG. 6 is a partial cross-sectional view of the measuring device of FIG. 5 in accordance with an alternative configuration.

In an alternative configuration, as shown in FIG. 6, the optical position sensor 510 includes two sets of light source and optical receiver so that the displacement direction of the measuring pin 506 can be detected. Thus, the optical position sensor 510 includes two light sources 514A and 514B and two associated optical receivers 516A and 516B. The two optical receivers 516A and 516B are vertically positioned in the opening 112 so that the optical receiver 516A is above the optical receiver 516B. In this configuration, changes in signals from the optical receivers 516A and 516B provide directional information. As an example, if both optical receivers 516A and 516B are aligned with a high reflective region of the measuring pin 506, then both optical receivers will generate high signals. If the measuring pin 506 is displaced upward, the bottom optical receiver 516B will generate a low signal while the top optical receiver 516A will continue to generate a high signal. However, if the measuring pin 506 is displaced downward, the top optical receiver 516A will generate a low signal while the bottom optical receiver 516B will continue to generate a high signal. Thus, the integrated circuit 518 is able to detect the direction of the measuring pin 506 by the changes in the signals from the optical receivers 516A and 518A.

Figure 7:
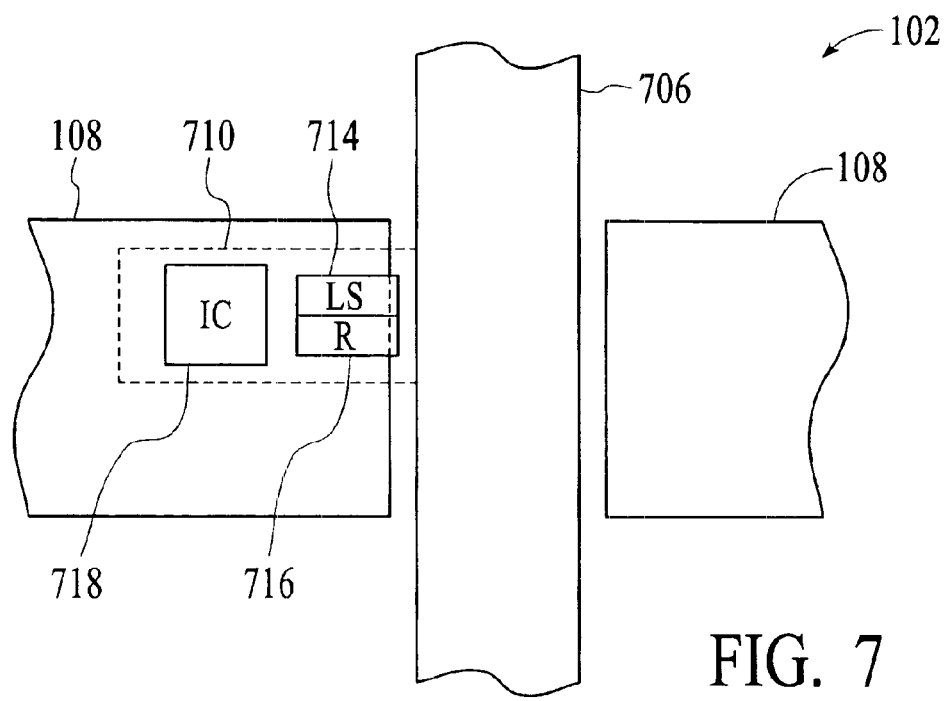
FIG. 7 is a partial cross-sectional view of the measuring device of the system of FIG. 1 in accordance with another embodiment of the invention.
Figures 8, 9:
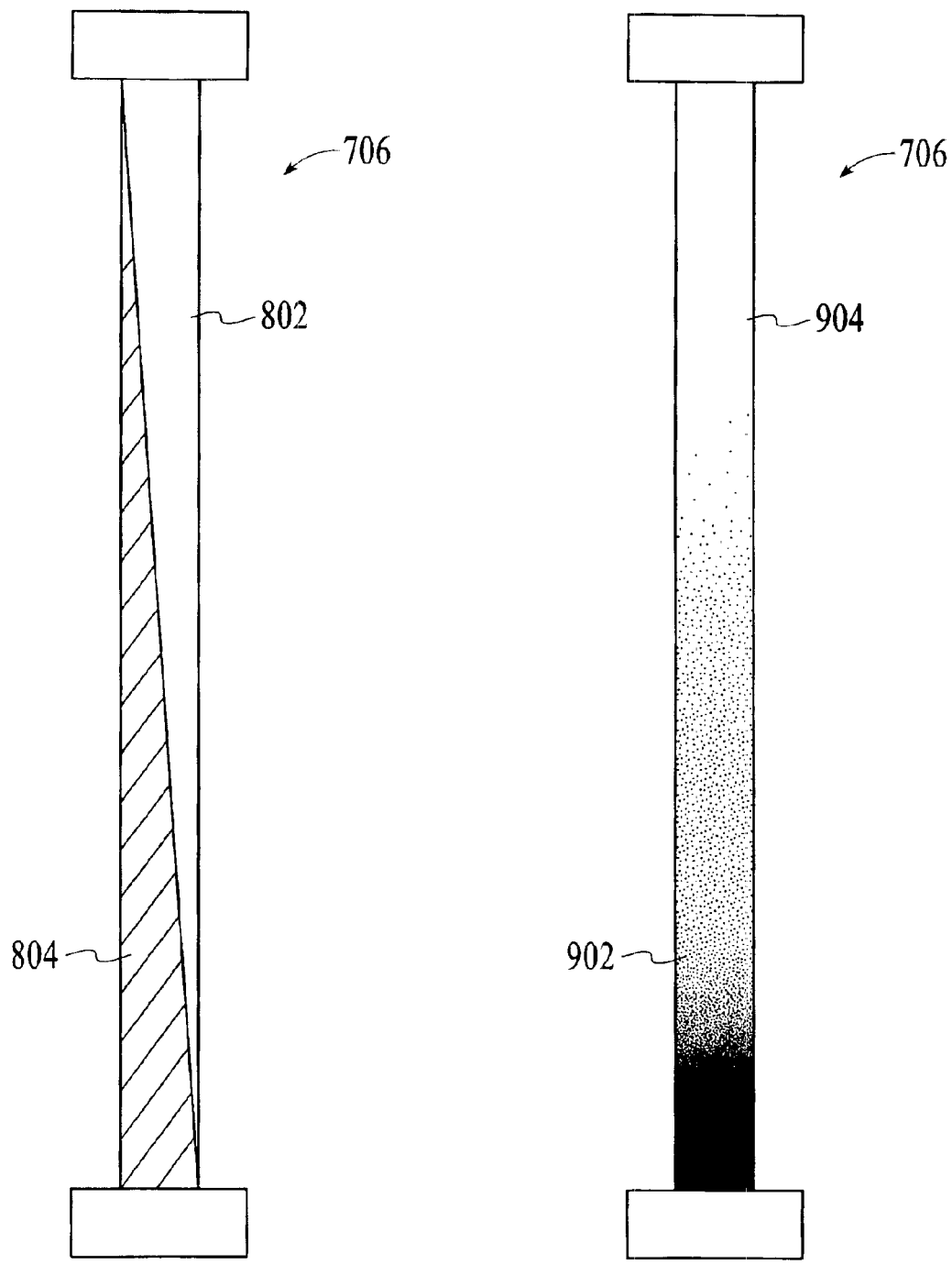
FIG. 8 is a side view of a displaceable measuring pin that can be used in the measuring device of FIG. 7.
FIG. 9 is a side view of another displaceable measuring pin that can be used in the measuring device of FIG. 7.

In other embodiments, the position sensors 110 of the measuring device 102 may be optical sensors that are designed to read displacement information embedded in the measuring pins 106 to determine the displaced distances of the pins. In one embodiment, the displacement information may be embedded in the measuring pins 106 in the form of varying surface reflectivity. That is, the surface reflectivity of the measuring pins 106 proportionally varies along the lengths of the measuring pins. Thus, the amount of light reflected from the measuring pins 106 depends on the positions of the measuring pins since the respective position sensors 110 are at fixed locations. FIG. 7 illustrates a portion of the measuring device 102, which shows an exemplary optical position sensor 710 and an associated measuring pin 706 with embedded displacement information in accordance with this embodiment. The displacement information is embedded in the measuring pin 706 in the form of varying surface reflectivity. Thus, the surface reflectivity varies at different locations along the length of the measuring pin 706. The varying surface reflectivity of the measuring pin 706 can be implemented in a number ways. As an example, the measuring pin 706 may include a side surface with a high reflective region 802 and a low reflective region 804 in a triangular arrangement, as shown in FIG. 8. The high reflective region 802 may be a region covered with metallic or white material, while the low reflective region 804 may a region covered with black material. In this arrangement, the surface reflectivity of the measuring pin 706 at a particular location along the length of the measuring pin will depend on the combined reflectivity of the high and low reflective regions 802 and 804 at that location. Thus, the surface reflectivity of the measuring pin 706 varies along the length of the pin. As another example, the measuring pin 706 may include a side surface with a varying amount of low reflective material 902 on a high reflective background 904 along the length of the pin, as shown in FIG. 9. The varying amount of low reflective material 902 affects the surface reflectivity of the measuring pin at different locations along the length of the measuring pin. In an alternative configuration, the side surface of the measuring pin 706 may have a varying amount of high reflective material on a low reflective background.

As shown in FIG. 7, the optical position sensor 710 includes a light source (LS) 714, an optical receiver (R) 716 and an integrated circuit 718. The light source 714 projects light toward a location along the length of the measuring pin 706. Some of the projected light is then reflected off the surface of the measuring pin 706 and received at the optical receiver 716. The amount of light reflected from the surface of the measuring pin 706 will depend on the surface reflectivity at that location, which corresponds to the position of the measuring pin. In response to the received light, the optical receiver 716 generates a signal proportional to the intensity of the received light. The optical receiver 716 is connected to the integrated circuit 718, which receives the signal from the optical receiver. Since the signal from the optical receiver 716 corresponds to the position of the measuring pin 706, the integrated circuit 718 is able to determine the displaced distance of the measuring pin 706 by the received signal from the optical receiver 716.

Figure 10:
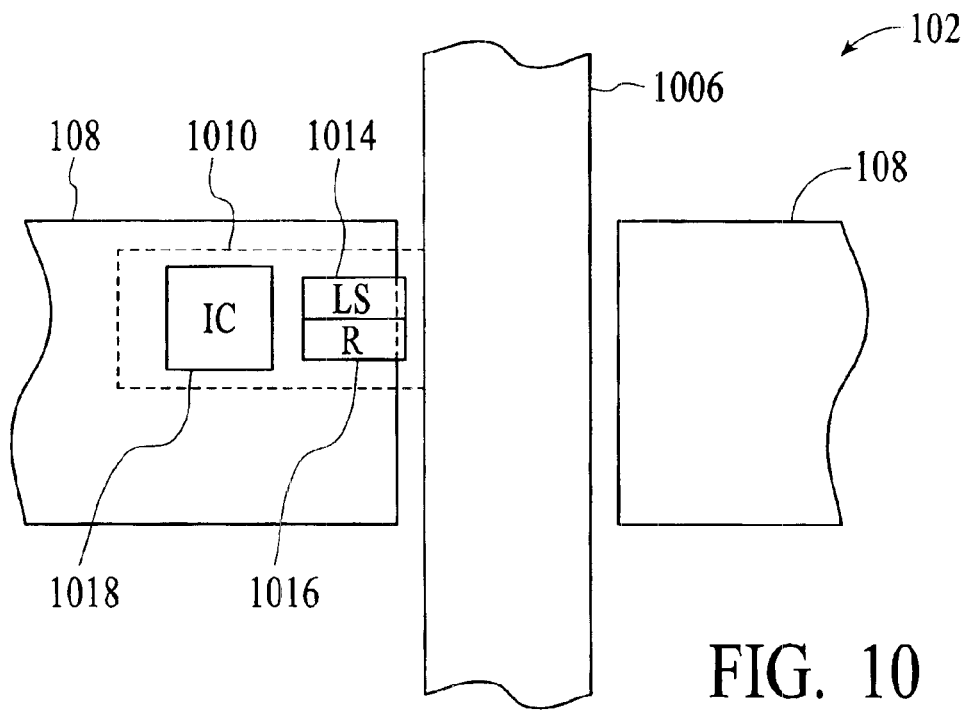
FIG. 10 is a partial cross-sectional view of the measuring device of the system of FIG. 1 in accordance with another embodiment of the invention.
Figure 11:
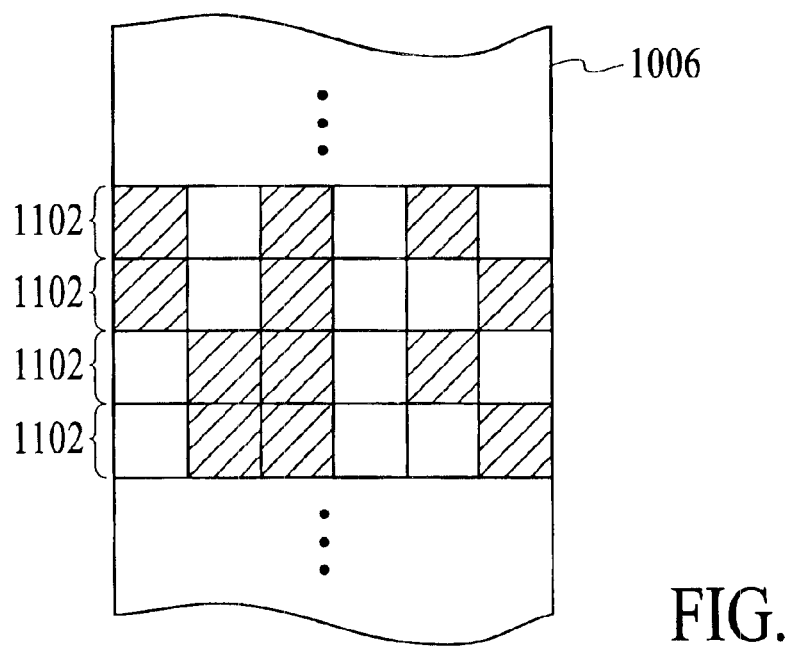
FIG. 11 is a partial side view of a displaceable measuring pin that can be used in the measuring device of FIG. 10.

In another embodiment, the displacement information may be embedded in the measuring pins 106 in the form of visual codes, which represent different pin positions. As an example, the visual codes may be visual binary patterns created by high and low reflective regions on the surfaces of the measuring pins 106. Again, the high reflective regions may be regions covered with metallic or white material, while the low reflective regions may regions covered with black material. For each measuring pin 106, different visual binary patterns are embedded along the length of the measuring pin so that the position of the measuring pin can be determined by reading a particular binary pattern at a location along the length of the pin from a fixed position. FIG. 10 illustrates a portion of the measuring device 102, which shows an exemplary optical position sensor 1010 and an associated measuring pin 1006 with embedded visual binary patterns in accordance with this embodiment. The embedded visual binary patterns of the measuring pin 1006 are shown in FIG. 11, which is an enlarged section of the measuring pin. Each visual binary pattern is formed of six regions that can be a combination of high and low reflective regions. The six regions represent six-bit binary information at a particular location along the length of the measuring pin 1006. Thus, the position of the measuring pin 1006 can be determined by reading one of the visual binary patterns at a corresponding location on the measuring pin.

Turning back to FIG. 10, the optical position sensor 1010 includes six sets of light source (LS) 1014 and optical receiver (R) 1016, and an integrated circuit 1018. In FIG. 10, only one set of light source 1014 and optical receiver 1016 is shown. Each set of light source 1014 and optical receiver 1016 is designed to read one of the six bits of the embedded visual binary pattern at a particular location along the length of the measuring pin 1006. The reading of a bit of the embedded binary pattern involves projecting light from one of the light sources 1014 onto a region of the binary pattern and then receiving reflected light at the associated optical receiver 1016. Since the intensity of the reflected light depends on the reflectivity of a targeted region, the optical receiver 1016 generates a high signal when the light reflected from a high reflective region and a low signal when the light is reflected from a low reflective region. The optical receivers 1016 are connected to the integrated circuit 1018, which receives the signals from the optical receivers. The integrated circuit 1018 is able to determine the displaced distance of the measuring pin 1016 by the binary pattern represented by the received signals from the optical receivers 1016.

Although the measuring pin 1006 has been illustrated and described as being embedded with six-bit binary information, the measuring pin may be embedded with less than or more than six-bit binary information. In such an embodiment, the optical sensor 1010 will include a corresponding number of light sources 1014 and optical receivers 1016.

Figure 12:
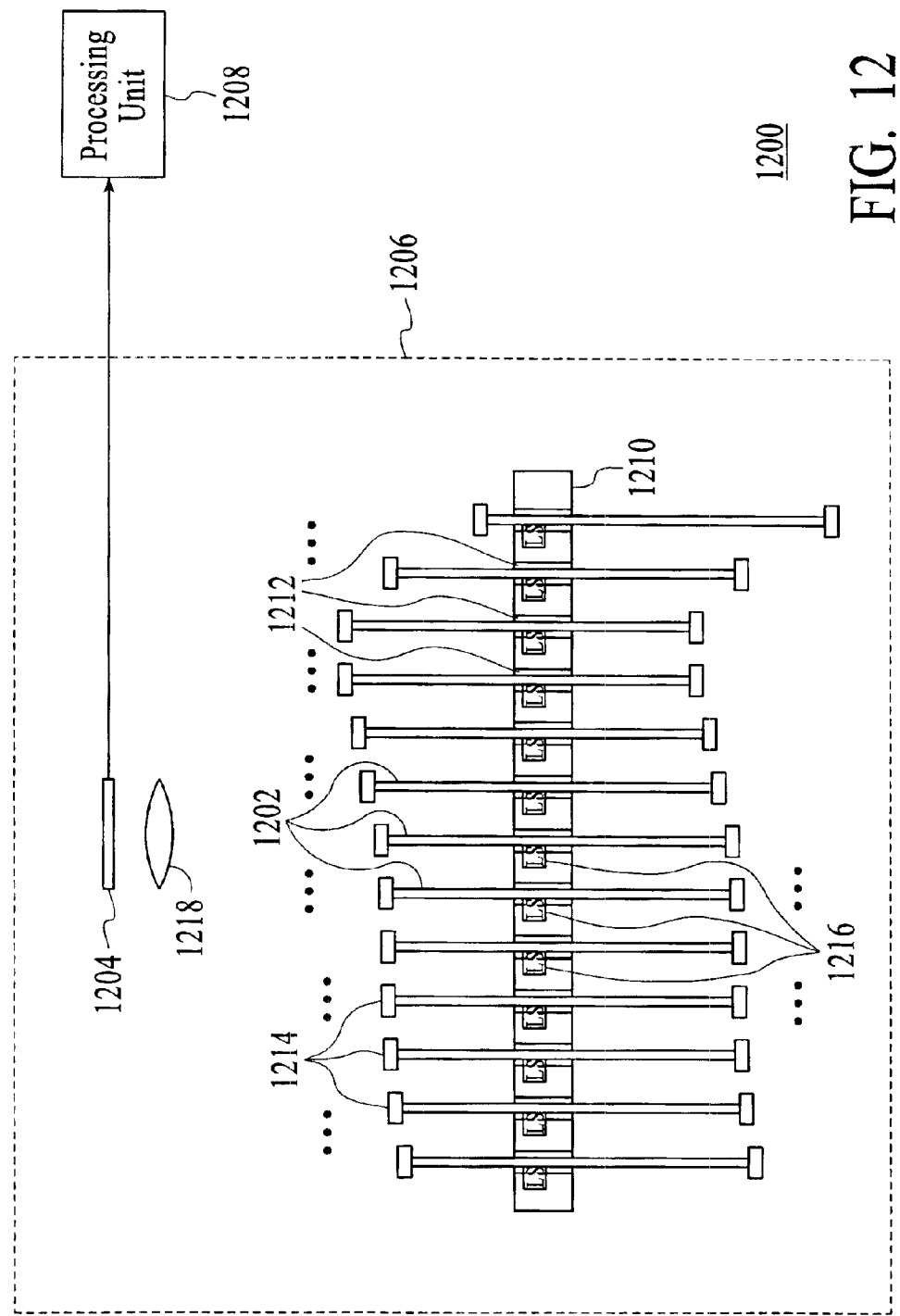
FIG. 12 is a diagram of a system for measuring three-dimensional objects in accordance with another embodiment of the invention.

Turning now to FIG. 12, a system 1200 for measuring three-dimensional objects in accordance with another embodiment of the invention is shown. Similar to the system 100 of FIG. 1, the system 1200 also utilizes displaceable measuring pins 1202 to measure relative positions of points on a surface of a three-dimensional object. However, instead of using multiple mechanical or optical position sensors, the system 1200 uses a single imaging sensor 1204 to determine the displaced distances of the measuring pins 1202.

As shown in FIG. 12, the system 1200 includes a measuring device 1206 with the imaging sensor 1204 and a processing unit 1208. In FIG. 12, a cross-section of the measuring device 1206 is illustrated. Similar to the measuring device 102 of the system 100, the measuring device 1206 includes a base 1210 and the displaceable measuring pins 1202, which are positioned in openings 1212 of the base so that the measuring pins can be individually displaced with respect to the base when the measuring pins are applied to a surface of a three-dimensional object to be measured. However, the displaceable measuring pins 1202 are made of transparent material, such as fiber optic material, to receive light into the measuring pins and cause internal reflections to guide the received light toward light diffusion ends 1214 of the pins. The light diffusion end 1214 of a measuring pin 1202 is opposite to the end that contacts a surface of a three-dimensional object to be measured. The measuring pins 1202 include side surfaces having transmissivity that proportionally varies along the lengths of the measuring pins. As an example, the measuring pins 1202 may include side surfaces with a transmissive region and a reflective region in a triangular arrangement, similar to the measuring pin 706 shown in FIG. 8. As another example, the measuring pins 1202 may include side surfaces with a changing amount of reflective material on a transmissive background, similar to the measuring pin 706 shown in FIG. 9.

The measuring device 1206 further includes light sources 1216 that are located within the base 1210 at the openings 1212 to project light onto the measuring pins 1202. The light sources 1216 are distributed in the base 1210 such that one light source is located at each opening 1212 of the base to project a single beam of light onto the respective measuring pin 1202. Since the side surface transmissivity of the measuring pins 1202 proportionally varies along the lengths of the measuring pins, the amount of projected light transmitted into the respective measuring pins depends on the relative positions of the measuring pins. Consequently, the amount of light emitted out of the light diffusion ends 1214 of the measuring pins 1202 corresponds to the relative positions of the measuring pins.

The measuring device 1206 also includes the imaging sensor 1204 and a lens 1218. The lens 1218 is positioned between the base 1210 and the imaging sensor 1204 so that the imaging sensor can image all the light diffusion ends 1214 of the measuring pins 1202. The imaging sensor 1204 may be a charge-coupled device (CCD) sensor or a complementary metal-oxide semiconductor (CMOS) sensor, and may be part of a digital camera. Thus, in an alternative embodiment, the imaging sensor 1204 may be replaced by an off-the-shelf digital camera. The imaging sensor 1204 captures an electronic image of the light diffusion ends 1214 of the measuring pins 1202 after the measuring pins have been displaced by a surface of a three-dimensional object being measured. Since the side surface transmissivity of the measuring pins 1202 proportionally varies along the lengths of the measuring pins, the intensities of lights emitted from the light diffusion ends 1214 of the measuring pins and captured by the imaging sensor 1204 will correspond to the displaced distances of the measuring pins. Consequently, the electronic image captured by the imaging sensor 1204 contains information regarding the displaced distances of the measuring pins. Thus, in this embodiment, the light sources 1216 and the imaging sensor 1204 are parts of a mechanism for determining the displaced distances of the measuring pins 1202.

The electronic image is transmitted to the processing unit 1208, where the image is processed to determine the displaced distances of the measuring pins 1202 using the intensities of lights emitted from the light diffusion ends 1214 of the measuring pins. The measured distances can then used to create a virtual three-dimensional model of the measured object. The processing unit 1208 may be any signal processing device, is such as a personal computer.

Figure 13:
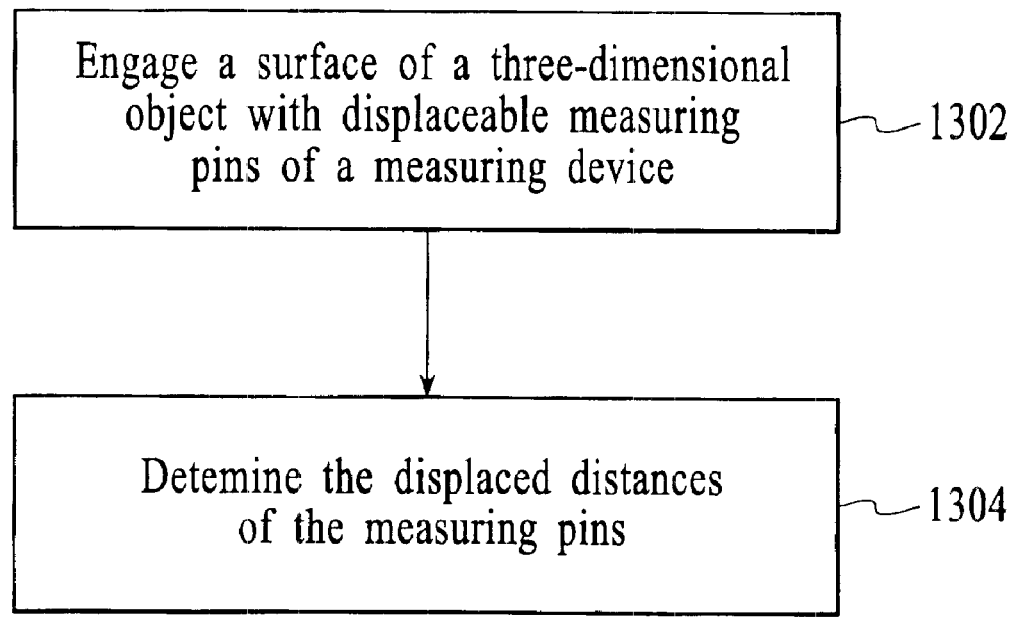
FIG. 13 is a process flow diagram of a method for measuring three-dimensional objects in accordance with an embodiment of the invention.

A method of measuring a three-dimensional object in accordance with an embodiment of the invention is described with reference to a process flow diagram of FIG. 13. At block 1302, a surface of the three-dimensional object is engaged with displaceable measuring pins of a measuring device. This engagement includes displacing the measuring pins in a direction parallel to the central axes of the pins in response to the object surface. Next, at block 1304, the displaced distances of the measuring pins are determined. The displaced distances of the measuring pins are measurements of the object surface. These measurements can be used to produce a three-dimensional model of the measured object. The displaced distances of the measuring pins can be determined by mechanically or optically tracking the movements of the pins. Alternatively, the displaced distances can be determined by reading visual displacement information embedded in the measuring pins. The displaced distances can also be determined by capturing an image of light diffusion ends of the measuring pins and then measuring the intensities of lights emitted from the light diffusion ends, where the intensifies of emitted lights vary according to the positions of the measuring pins.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A system for measuring a three-dimensional object, said system comprising:
    a base;
    elongate measuring members operatively connected to said base such that said elongate measuring members can be displaced with respect to said base in response to a surface of three-dimensional object, said elongate measuring members including displacement information embedded in said elongating measuring members along the lengths of said elongate measuring members; and
    means for determining displaced distances of said elongate measuring members due to said surface of said three-dimensional object, said displaced distance of said elongate measuring members being measurements of said surface of said three-dimensional object, said determining means being configured to optically use said displacement information of said elongate measuring member at displaced locations along the lengths of said elongate measuring members to determine said displaced distances.

2. The system of claim 1 wherein ad elongate measuring members operatively connected to said base such that said elongate measuring members can be displaced in a direction parallel to central axes of said elongate measuring members, said central axes corresponding to the lengths of said elongate measuring members.

3. The system of claim 1 wherein said determining means includes optical sensors that arm coupled to said base, said optical sensors being configured to optically read said displacement information embedded in said elongate measuring members at said displaced locations along the lengths of said elongate measuring members.

4. The system of claim 3 wherein said elongate measuring member have reflectivity that varies along the lengths of said elongate measuring member said reflectivity of said elongate measuring members being said displacement information embedded in said elongate measuring members.

5. The system of claim 3 wherein said displacement information embedded in said elongate measuring members includes different codes along the length of each of said elongate measuring members.

6. The system of claim 1 wherein said elongate measuring members have transmissivity that varies along the lengths of said elongate measuring members, and wherein said determining means includes light sources and an imaging sensor, said light sources being positioned to project lights into aid elongate measuring members at said displaced locations along the lengths of said elongate measuring members, said imaging sensor being positioned to capture an image of light-emitting ends of said elongate measuring members.

7. The system of claim 6 further comprising a processing unit configured to process said image to determine intensities of lights emitted from said light-emitting ends of said elongate measuring members, said intensities of lights corresponding to said displaced distances of said elongate measuring members.

8. The system of claim 5 wherein said different codes along the length of each of said elongate measuring members include visual binary patterns of high and low reflective regions.

9. A system for measuring a three-dimensional object, said system comprising:
    a base;
    elongate measuring members operatively connected to said base such that said elongate measuring members can be displaced with respect to said base in response to a surface of said three-dimensional object, said elongate measuring members including displacement information embedded in said elongate measuring members along the lengths of said elongate measuring members; and
    a displacement-determining mechanism operatively coupled to said elongate measuring members, said displacement-determining mechanism being configured to determine displaced distances of said elongate measuring members due to said surface of said three-dimensional object, said displaced distances of said elongate measuring member being measurements of said surface of said three-dimensional object, said displacement-determining mechanism being configured to optically use said displacement informal of said elongate measuring members at displaced locations along the lengths of said elongate measuring members to determine said displaced distances.

10. The system of claim 9 wherein said elongate measuring members are operatively connected to said base such that said elongate measuring members can be displaced in a direction parallel to central axes of said elongate measuring members, said central axes corresponding to the lengths of said elongate measuring members.

11. The system of claim 9 wherein said displacement determining mechanism includes optical sensors that are coupled to said base, said optical sensors being configured to optically read said displacement information embedded in said elongate measuring members at said displaced locations along the lengths of said elongate measuring members.

12. The system of claim 11 wherein said elongate measuring members have reflectivity that varies along the lengths of said elongate measuring members, said reflectivity of said elongate measuring members being said displacement information embedded in said elongate measuring members.

13. The system of claim 11 wherein said displacement information embedded in said elongate measuring members includes different codes along the length of each of said elongate measuring members.

14. The system of claim 11 wherein said different codes along the length of each of said elongate measuring members include visual binary patterns of high and low reflective regions.

15. The system of claim 9 wherein said elongate measuring members have transmissivity that varies along the lengths of said elongate measuring members, and wherein said displace displacement-determining mechanism includes light sources and an imaging sensor, said light sources being positioned to project lights into said elongate measuring at said displaced locations along the lengths of said elongate measuring members, said imaging sensor being positioned to capture an image of light-emitting ends of said elongate measuring members.

16. The system of claim 15 further comprising a processing unit configured to said image to determine intensities of lights emitted from said light-emitting ends of said elongate measuring members, said intensities of lights corresponding to said displaced distances of said elongate measuring members.

17. A method for measuring a three-dimensional object, said method comprising:
engaging a said surface of said three-dimensional object with displaceable measuring members, including displacing said displaceable measuring members in response to said surface of said three-dimensional object, said displaceable measuring members including displacement information embedded in said displaceable being members along the lengths of said elongate me members; and
determining displaced distances of said displaceable measuring members by optically using said displacement information of said displaceable measuring members at displaced locations along the lengths of said displaceable measuring members, said displaced distances providing measurements of said surface of said three-dimensional object.

18. The method of claim 17 wherein said displacing of said displaceable measuring members includes displacing said displaceable measuring members in a direction parallel to central axes of said displaceable measuring members, said central axes corresponding to the lengths of said displaceable measuring members.

19. The method of claim 17 wherein said determining of said displaced distances includes reading said displacement information embedded in said displaceable measuring members at said displaced locations along the lengths of said displaceable measuring members.

20. The method of claim 19 wherein said reading of said displacement information includes measuring light reflected off said displaced locations along the lengths of said displaceable measuring members, said displaceable measuring members having reflectivity that varies along the lengths of said displaceable measuring members.

21. The method of claim 19 wherein said reading of said displacement information includes reading codes on said displaceable measuring members at said displaced locations along the lengths of said displaceable measuring members, each of said displaceable measuring members having different codes along its length.

22. The method of claim 17 wherein said determining of said displaced distances includes projecting lights into said displaceable measuring members at said displaced locations along the lengths of said displaceable measuring members and capturing an image of light-emitting ends of said displaceable measuring members, said displaceable measuring members having transmissivity that varies along the length of said displaceable measuring members.

23. The method of claim 22 further comprising processing said image to determine intensities of lights emitted from said light-emitting ends of said displaceable measuring members, said intensities of lights corresponding to said displaced distances of said elongate measuring members.

* * * * *